Sept. 18, 1923. Re. 15,685

S. HOAR

MECHANICAL SHOVEL

Original Filed Sept. 15, 1920 2 Sheets-Sheet 1

Inventor
SAMUEL HOAR
By Paul, Paul & Moore
ATTORNEYS

Sept. 18, 1923. Re. 15,685

S. HOAR

MECHANICAL SHOVEL

Original Filed Sept. 15, 1920 2 Sheets-Sheet 2

Inventor
SAMUEL HOAR
By Paul, Paul & Moore,
ATTORNEYS

Reissued Sept. 18, 1923. Re. 15,685

UNITED STATES PATENT OFFICE.

SAMUEL HOAR, OF VIRGINIA, MINNESOTA, ASSIGNOR TO REX LOADING AND ENGINEERING COMPANY, OF DULUTH, MINNESOTA, A CORPORATION OF MINNESOTA.

MECHANICAL SHOVEL.

Original No. 1,448,537, dated March 13, 1923, Serial No. 410,416, filed September 15, 1920. Application for reissue filed June 23, 1923. Serial No. 647,406.

*To all whom it may concern:*

Be it known that I, SAMUEL HOAR, a citizen of the United States, residing at Virginia, in the county of St. Louis and State of Minnesota, have invented certain new and useful Improvements in Mechanical Shovels, of which the following is a specification, reference being had therein to the accompanying drawing.

This invention relates to mechanical shovels and the embodiment here illustrated and described is especially designed for tunneling purposes where room for operating the device may be considerably restricted such as experienced in coal, iron or other mines and for which purpose my present invention is particularly designed.

It is evident that this or a slightly modified form may be used with equally good results where open shoveling is required and such machines employed.

The principal object of the invention is to provide a more practical mechanical shovel than heretofore known and one requiring as little space as possible in which to operate.

Another object of the invention is to provide a combination dipper stick which results in novel flexibility of the dipper.

Still other objects and advantage of the novel combination of parts will appear in the further description of the invention.

In the accompanying drawings forming part of this application and in which like reference characters represent like parts:

1 represents a car mounted upon four wheels 2—2 and 3—3, the latter or rear wheels being considerably larger in diameter than the former for the purpose of producing a forward downward inclination to the body of the car, the particular object of which will appear later.

A turntable having cooperative interlocking parts 4 and 5 is mounted upon the car body and supports the adjustable superstructure, the floor of which is illustrated at 6. This superstructure may be of any desired form of fabrication to provide the necessary strong support for the operating parts of the machine.

I have shown the upright ends of the superstructure as being composed of angle bars 7—7 at the rear end and 8—8 at the forward end, upon the upper extremities of which is supported the inclined shovel carriage track and which comprises two spaced channel bars 9—9 facing inwardly towards each other and which are rigidly fixed in the upper ends of the angles.

Figure 2:
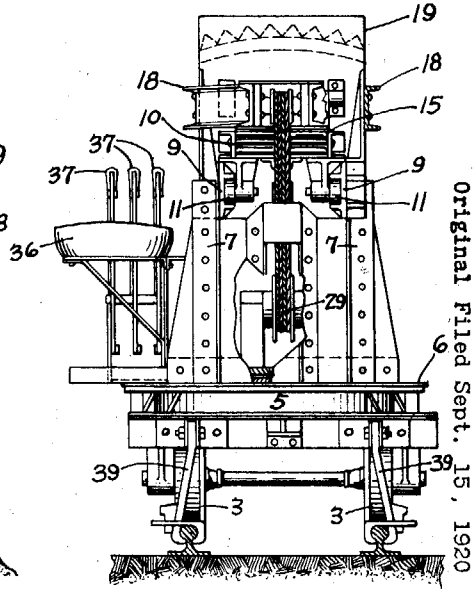
Figure 2 is a rear elevation, partly in section, of Figure 1.

Intermediate of the channels 9—9 and reciprocally carried therein is the shovel carriage 10, it being provided with preferably three pairs of rollers or wheels 11 which travel within the channels 9—9 as clearly shown in Figure 2 of the drawings, said wheels or rollers 11 being the full depth of the channels to prevent undesirable vertical movement of the carriage.

The carriage 10 is of fabricated construction having the forward end thereof extending above and beyond the foremost pair of rollers 11, and, pivotally mounted in such extension, as at 12, is the auxiliary dipper stick 13. The auxiliary stick 13 extends rearwardly to a distance approximately equal to the length of the carriage 10 and is attached to the rear end of said carriage by a suitable line or chain 14, and in the rear end of the auxiliary dipper stick is mounted a transversely disposed roller 15, which is engaged by the dipper manipulating line 16 when the dipper is in operation.

On the opposite end of the auxiliary dipper stick 13 is pivotally mounted as at 17 the principal dipper stick 18 which latter carries upon its forward end the fixed dipper 19 and is manipulated by the line 16 being attached to the opposite end as at 20. A single line only is required for operating the dipper as the material engaging end thereof is at all times heavier than the handle end and will naturally go to its work by gravity. However, a second line 21 is required for the operation of the carriage 10 and which second line is attached at one end to the carriage as at 22 and passes to and around a suitable sheave 23 adjacent the rear end of the superstructure of the vehicle and from there to and around the driving drum 24, while the opposite end leads forwardly to and around the sheave 25 up to and around a suitable sheave or roller 26 mounted in the rear end of the carriage 10 and thence to a suitable fastening as at 27, adjacent the forward end of the carriage. By this means it is evident that the rotation of the drum 24 will produce a pull inwardly upon one portion of the line simultaneously with the slacking off of the other portion and whereby alternate reverse rotation of the drum 24 will produce reciprocation of the carriage. A sheave 28 is installed centrally in the rear of the superstructure and over which the dipper manipulating line 16 passes to a suitable winding drum 29.

I have shown what are commonly known as Dake air engines for furnishing power to the various drums and operating mechanism of the shovel, but it is evident that their application or combination with the specific structure does not enter into the invention as electric or other forms of motors may be employed when desired.

The turntable upon which the superstructure is mounted, is, as before stated, composed of the two interlocking ring sections 4 and 5 which are cooperatively engaged with the base ring or section 30, which latter is fixed to the chassis of the vehicle, there being two sets of bars, one intermediate of the rings 4 and 30, and one intermediate of the rings 4 and 5, thus providing a simple durable anti-friction bearing for the superstructure. The gear mechanism for operating said superstructure is illustrated at 32, 33, 34 and 35, the specific arrangement of which does not constitute part of my present invention.

The seat for the operator is shown at 36 as conveniently located upon the side of the superstructure and each motor is operated in either direction by a single lever as indicated at 37, there being three of such motors in the machine, one for rotating the superstructure, one for reciprocating the carriage and one for manipulating the shovel.

38 represents a suitable air line to a suitable connection for air hose for supplying power to the motors and I have shown at 39 a convenient form of rail anchor or holding means for the rear end of the shovel during its operation to prevent lifting from the track.

Figure 1:
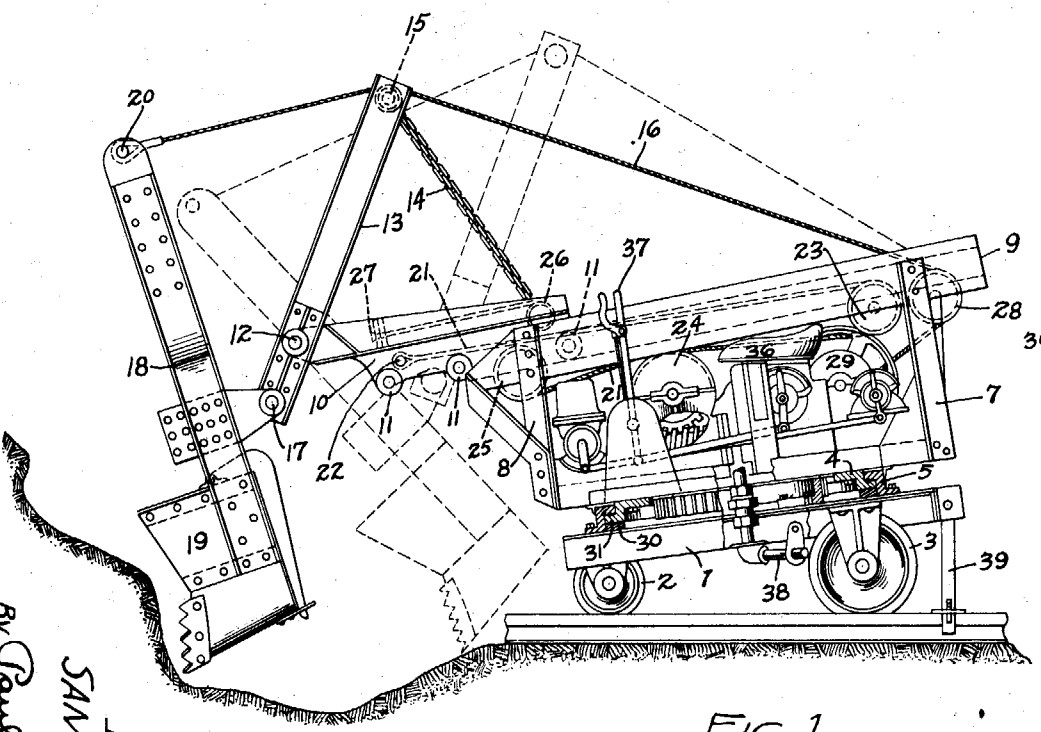
Figure 1 is a side elevation partly in section of one embodiment of my invention.
Figure 3:
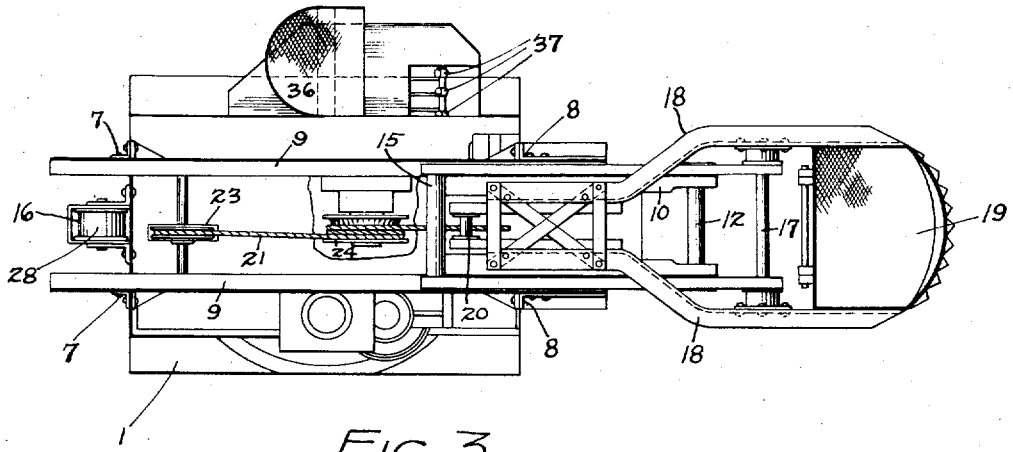
Figure 3 is a top plan view, partly broken away, of the shovel with the dipper in the position illustrated in Figure 4.
Figure 4:
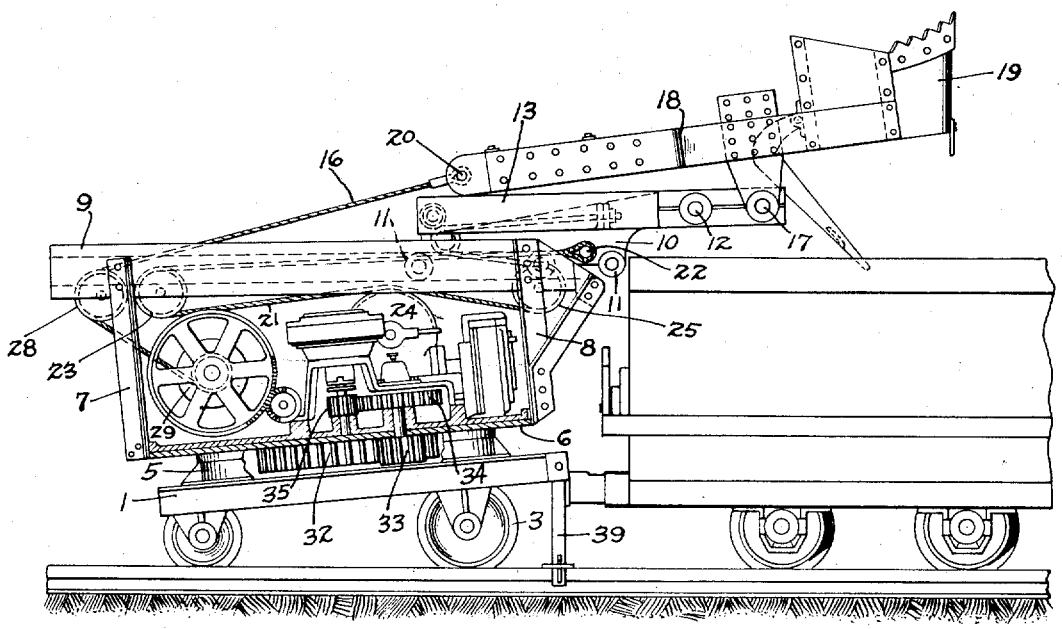
Figure 4 is a side elevation, partly in section, of the shovel with the dipper in position for discharging its load into a tram car.

It will be noted that the free end of the auxiliary dipper stick 13 is in no way directly attached to the shovel manipulating line 16, but simply bears upwardly against the line when the shovel is in the act of digging, and, when the shovel is drawn rearwardly, as shown in dotted lines Figure 1, in the act of digging, should it become excessively engaged during such act, a continued draft upon the line 16 will tend to force downwardly the free end of the auxiliary dipper stick and thus cause a lifting effect upon the dipper which will tend to free its hold though not prevent its subsequent advancement in working, or, in other words, the dipper stick, having two fulcrumed points spaced from each other and one being automatically operated as above described, provides an extremely desirable flexibility of the dipper while at work.

In respect to the inclination of the car or vehicle 1 upon wheels greater in diameter in the rear than in the forward end thereof, it will be noted that when the dipper is swung about with its load upon such inclined vehicle it will be simultaneously elevated and turned, thus enabling the dipper to discharge its load in the highest tram car possible with the minimum elevation of the dipper, as it is understood that this shovel is designed particularly for tunnel work where space both vertically and horizontally is extremely limited.

Having thus described my invention what I claim and desire to secure by Letters Patent, is:—

1. In a mechanical shovel, the combination with a portable inclined turntable, of a superstructure supported upon the turntable, an inclined track upon the superstructure, a reciprocable carriage upon the track, an auxiliary dipper stick pivotally carried upon the carriage, a dipper stick and dipper carried upon the auxiliary stick, and means for simultaneously operating both dipper sticks.

2. In a mechanical shovel, the combination with a vehicle, having a turntable thereupon, of a superstructure supported upon the turntable, an inclined track carried by the superstructure, a reciprocal carriage carried by the superstructure, an auxiliary dipper stick pivotally carried upon the carriage, a dipper stick and dipper carried upon the auxiliary stick, and a single line for simultaneously operating both dipper sticks.

3. In a mechanical shovel, the combination with a vehicle having a turntable thereupon, of a superstructure supported upon the turntable, a carriage reciprocally carried in the superstructure, an auxiliary dipper stick pivotally carried upon the carriage, a dipper stick and dipper carried upon the auxiliary stick, independent means for operating the carriage and the superstructure, and a single line for simultaneously operating both dipper sticks.

4. In combination a vehicle, a superstructure, upon the vehicle, an auxiliary dipper seick pivotally carried by the superstructure, a dipper stick and dipper pivotally carried by the auxiliary dipper stick, a single operating line attached to the combined dipper and stick, and means carried by the auxiliary stick engaging said line and operating the auxiliary stick for the purpose described.

5. In a mechanical shovel the combination with a portable vehicle, of an auxiliary dipper stick pivotally carried thereupon, the pivotal point being spaced from the lower end of the stick, a combined dipper stick and dipper pivotally carried upon extreme lower end of the auxiliary dipper stick, a single operating line permanently attached to the dipper-carrying stick, and the free end of the auxiliary stick engaging said line for the purpose described.

6. In a mechanical shovel, the combination with a portable vehicle, of an auxiliary dipper stick pivotally and reciprocably carried thereupon, the pivotal point being spaced from the lower end of the stick, a combined dipper stick and dipper pivotally carried upon the extreme lower end of the auxiliary dipper stick, a single operating line attached to the dipper-carrying stick and engaging the free end of the auxiliary stick, means for limiting the upward motion of the upper end of the auxiliary stick, and means on the vehicle for operating the line, substantially as described.

7. A mechanical shovel comprising a rotatable structure inclined to a horizontal, a traveling carriage mounted on said structure, an auxiliary stick pivotally supported from the carriage, a stick carrying a dipper pivotally supported from the auxiliary stick, and flexible means connected to the dipper-carrying stick and bearing upon the auxiliary stick.

8. A mechanical shovel comprising a rotatable structure inclined to a horizontal, a carriage supported to travel the incline of the structure, an auxiliary and a dipper-carrying stick both supported by the carriage and foldable one upon the other over the rotatable structure.

9. A mechanical shovel comprising a supporting structure, an auxiliary dipper stick pivotally supported from the structure, a main dipper stick pivotally supported from the auxiliary stick below the pivot of the latter, and carrying a dipper, and flexible means connected to the upper end of the main stick and slidable upon the upper end of the pivoted auxiliary stick.

10. A mechanical shovel comprising a turntable, a superstructure supported on the table, a pivoted auxiliary stick, a dipper stick and dipper pivotally supported from the auxiliary dipper stick below the pivot of the latter, and a cable means having a running bearing upon the auxiliary dipper stick and connecting the other dipper stick with means for exerting a pull on the cable means.

11. A mechanical shovel comprising a rotatable support, a traveling carriage sustained by the support, an auxiliary dipper stick pivotally supported from the traveling carriage, a dipper stick and dipper pivotally supported from the auxiliary dipper stick below the pivot of the latter, and a cable connected to the dipper stick carrying the dipper and bearing upon the auxiliary dipper stick.

12. In a mechanical shovel, the combination with a vehicle, a superstructure supported to turn upon the vehicle, a track carried by the superstructure, a reciprocable carriage carried by the superstructure, an auxiliary dipper stick pivotally carried upon the carriage, a dipper stick and dipper carried upon the auxiliary stick, and a single line for simultaneously operating both dipper sticks.

In witness whereof, I have hereunto set my hand this 23rd day of July, 1923.

SAMUEL HOAR.